Figure 1:
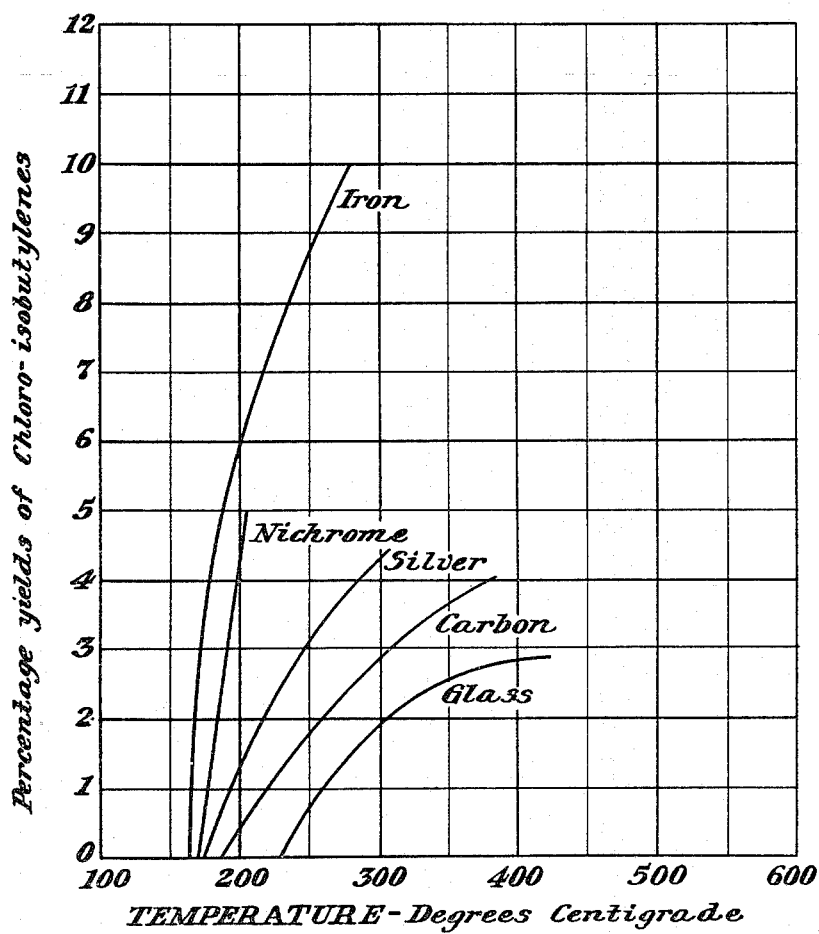

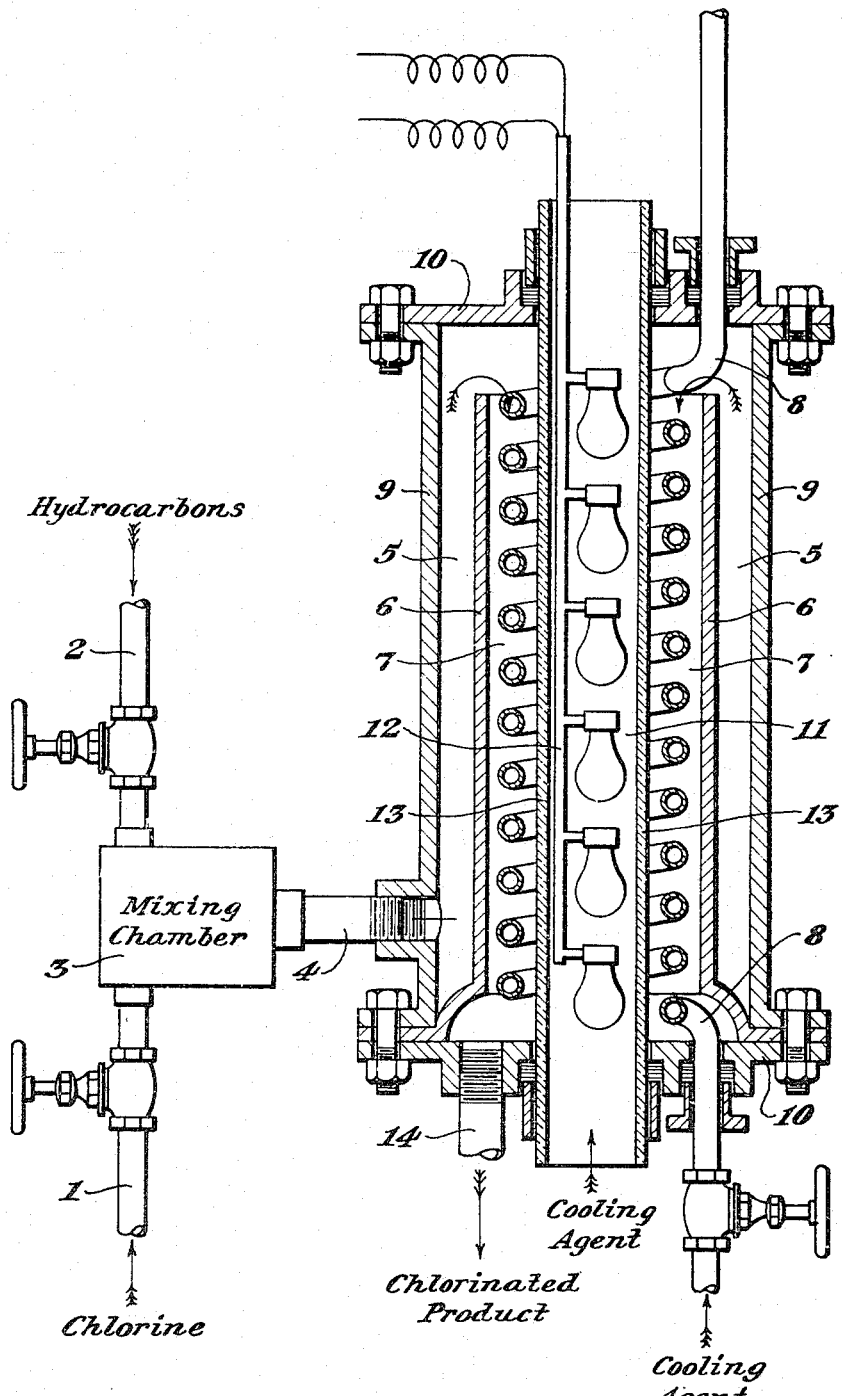

Patented Apr. 10, 1934

1,954,438

UNITED STATES PATENT OFFICE 1,954,438

METHOD OF CHLORINATING ALIPHATIC HYDROCARBONS

Edgar C. Britton, Gerald H. Coleman, and Bartholdt C. Hadler, Midland, Mich., assignors to The Dow Chemical Company, Midland, Mich., a corporation of Michigan Application October 10, 1932, Serial No. 636,996

14 Claims. (Cl. 260—166)

The present invention concerns an improved method of reacting a saturated aliphatic hydrocarbon, containing more than two and less than six carbon atoms, with chlorine, whereby desired chlorinated hydrocarbons (particularly monochlorinated products) may be obtained in high yield and large quantity at low cost, substantially all chlorine employed may be reacted, formation of olefinic by-products, e. g. olefines and chloroolefines, may substantially be prevented, and separation of desired chlorinated products from the reacted mixture is rendered relatively simple and inexpensive.

It is known that during vapor phase chlorination of a saturated aliphatic hydrocarbon containing more than two carbon atoms, according to usual methods, a complex and difficultly separable mixture of products is obtained. Ayres, Ind. Eng. Chem. 21, 901 (1929) has reported that during vapor phase chlorination of a mixture of isomeric pentanes, amylenes are ordinarily formed in considerable quantity. Such formation of amylenes, he has pointed out, is highly disadvantageous in that amylenes cannot be fractionally distilled from unreacted pentanes, hence are returned with the latter to the reaction wherein they are chlorinated to form polychlorinated compounds and may be polymerized to form tars.

Ayres, in the reference mentioned above, reports that the formation of amylenes may be suppressed by chlorinating the pentanes under the action of heat in the presence of a large excess of pentanes. In practice, he first mixes chlorine with between 15 and 20 times its volume of pentanes, the mixing operation being carried out in the dark at about 100° C. The gaseous mixture is then passed through a tubular iron reactor heated to about 275°–325° C., chlorinated products are separated from unreacted pentanes, and the latter are recycled through the steps just described. Light is not used to catalyze the chlorination.

While the method described by Ayres may possess the advantage of limiting the production of amylenes during chlorination of pentanes, it embodies the commercially disadvantageous features of requiring a costly separation of desired chlorinated products from a great excess of unreacted pentanes and of requiring continual recycling of the great excess of pentanes through the steps of his process. Obviously, a method of chlorinating aliphatic hydrocarbons which will avoid formation of olefines during chlorination and which will at the same time provide for employment of a smaller excess of hydrocarbon over chlorine than is required in Ayres' method, is much to be desired.

We have found the problem of olefine formation, during vapor phase chlorination of any saturated aliphatic hydrocarbon containing more than two and less than six carbon atoms, to be even more serious than has been reported by Ayres. In addition to formation of simple olefines during such chlorination, we have found that chloro-olefines are frequently formed in considerable quantity, particularly if the gaseous mixture is reacted in contact with metal surfaces heated to a temperature appreciably higher than 200° C.

Olefine formation during chlorination results in all of the disadvantages described by Ayres. The olefine products cannot readily be fractionally distilled from unreacted hydrocarbons and when returned to the reaction with the latter, olefines are chlorinated to form polychloro-compounds and frequently are polymerized to form tars which tend to plug the apparatus and prevent smooth operation of the process as a whole.

We have found formation of a chloro-olefine during chlorination of an aliphatic hydrocarbon to be even more highly disadvantageous than is the formation of an olefine. The chloro-olefine by-product usually boils at substantially the same temperature as does a desired alkyl chloride product so that the latter is obtained in impure state and cannot readily be purified through fractional distillation thereof. For instance, during vapor phase chlorination of isobutane, chloro-isobutylenes are frequently formed having substantially the same boiling points as does isobutyl chloride which is a desired product from the reaction, and the latter cannot be separated from the chloroisobutylenes by-products through fractional distillation. Again, during chlorination of propane, chloro-propylenes, e. g. allyl chloride, are often formed. Allyl chloride (B. P. approximately 45° C.) cannot readily be fractionally distilled from normal propyl chloride (B. P. 46.5° C.) which is one of the products from the reaction. The presence of an appreciable quantity of a chloroolefine in an alkyl chloride seriously reduces the value of the latter as a commercial product and frequently inhibits reactions in which it is desired to employ said alkyl chloride as a reactant.

We have now found that a mixture of chlorine with between 1 and 10 times its volume of a gaseous aliphatic hydrocarbon containing more than two and less than six carbon atoms may be reacted smoothly to form desired chlorinated products in high yield and at low cost and that simultaneous formation of olefines and chloro-olefines may substantially (and often completely) be prevented through carrying the reaction out in as short a time as possible and by maintaining surfaces in contact with the reacting mixture at a temperature below 200° C. The gaseous mixture itself may be at a temperature higher than 200° C. during reaction, but ordinarily the reaction temperature should not exceed 250° C. In practice we find it advisable to maintain both the gaseous mixture and surfaces in contact with the same at a temperature below 200° C. during reaction. In addition to the foregoing, we have found that the gaseous mixture, even after the reaction is completed, should not be contacted with foreign materials maintained at a temperature appreciably higher than 200° C., whether such foreign materials be gaseous (e. g. steam), liquid (e. g. water, oil, etc.), or solid surfaces such as iron, steel, copper, nickel, etc.

To the accomplishment of the foregoing and related ends, the present invention consists of the method hereinafter fully described and particularly pointed out in the claims, the annexed drawings and the following description setting forth in detail several modes of carrying out the invention, such disclosed modes illustrating, however, but several of various ways in which the principle of the invention may be used.

In the annexed drawings, Fig. 1 is a graph showing the percentage yields of chloro-isobutylenes obtained through chlorinating isobutane in the presence of certain contact materials (or surfaces) at a number of different temperatures. The data graphically presented in Fig. 1 will be discussed more fully at a point later in the description of our invention.

Fig. 2 of the annexed drawings is a sketch showing a cross-sectional view of apparatus suitable for employment in chlorinating an aliphatic hydrocarbon according to the method hereinafter described. In the apparatus shown by Fig. 2, (1) is an inlet for gaseous chlorine and (2) is an inlet for a gaseous aliphatic hydrocarbon reactant; (3) is a dark chamber wherein the gaseous reactants are mixed prior to passing to the chlorinator; (4) is a non-transparent tube permitting passage of the gaseous mixture from mixing chamber (3) to heat exchange chamber (5); (6) is a baffle tube separating heat exchange chamber (5) from reaction chamber (7). Within reaction chamber (7) is located cooling coil (8). Baffle tube (6), the reactor's outer shell (9), and the reactor heads (10) are constructed of materials which are non-transparent to light, e. g. iron, steel, nickel, nichrome, etc. Chamber (11) serves both as a cooling chamber and also as a chamber within which the string of electric lamps (12), which furnish light to catalyze the chlorination, are located. Tube (13) which forms the outer wall of chamber (11) is composed of material which is transparent to light, e. g. glass, quartz, etc. The reacted gaseous mixture passes from the reactor through outlet (14). Tube 13 and cooling tube (8) are fitted into the heads of the reactor by means of stuffing boxes, as shown, and the entire apparatus may readily be dissembled for repairs.

In chlorinating isobutane, using apparatus similar to that shown in Fig. 2 of the annexed drawings and described above, we operate in the following manner. Chlorine and isobutane are introduced through inlets (1) and (2), respectively, to mixer (3) wherein they are mixed thoroughly in the dark at a temperature below 125° C. and preferably at about room temperature. The gaseous mixture, which should contain between 1 and 10 moles of hydrocarbon reactant for each mole of chlorine present, passes through tube (4) into chamber (5) wherein the gaseous mixture enters into heat exchange relationship with the gaseous mixture within reaction chamber (7), thereby tending to lower the reaction temperature and particularly to cool baffle tube (6). From heat exchange chamber (5) the gaseous mixture passes into reaction chamber (7) as indicated by the arrows, wherein it is reacted under the influence of light issuing from the string of lamps (12). Heat liberated during chlorination tends to heat the reacting mixture to a high temperature. In order to prevent over-heating of the reacting gases, and particularly in order to maintain surfaces in contact with said gases at a temperature below that at which such surfaces catalyze olefine and chloro-olefine formation, cooling fluids are passed through cooling tube (8) and chamber (11). The cooling fluids so employed may be either gaseous or liquid (e. g. air, nitrogen, steam, water, oil, etc.) and they may be passed through the cooling means either in a direction co-current with, or counter-current to the general direction of flow of the gaseous reaction mixture. The chlorinated mixture passes from reaction chamber (7) through outlet (14) and thereafter the desired products may be separated in any of the usual ways.

In separating the various components of a chlorinated mixture obtained by a method similar to that described above, we prefer to operate as follows. The chlorinated mixture is first passed through cooling apparatus wherein it is cooled to a temperature below 100° C. (preferably to room temperature or lower) and a considerable portion of the chlorinated hydrocarbon products are condensed and removed from the system. The residual gaseous mixture is then scrubbed with water to remove hydrogen chloride (and a relatively small quantity of chlorinated hydrocarbons) therefrom. The gaseous mixture which remains after such treatment is preferably again cooled to condense all residual chlorinated products, and the remaining gases (which consist substantially of unreacted hydrocarbon) are again mixed with chlorine and returned to the reaction. The condensed chlorinated products may be separated through fractional distillation.

While the above description is restricted to the chlorination of isobutane using apparatus similar to that shown in Fig. 2 of the annexed drawings, any saturated aliphatic hydrocarbon containing more than two and less than six carbon atoms (e. g. propane, normal butane, normal pentane, isopentane, etc.) may be chlorinated successfully according to the same general method and the apparatus employed during chlorination may differ radically in construction from that shown in Fig. 2. For instance, the reaction chamber may be constructed entirely of glass, a transparent fluid may be used to cool the reaction chamber, and the light source may be located outside the entire apparatus. It is to be understood that our improved mode of operation is not limited to employment of apparatus of any particular design or construction.

In order that our method of chlorinating aliphatic hydrocarbons may be understood fully, the theory underlying our improved mode of operation will be discussed briefly and a series of experiments in substantiation of such theory will be described. We have previously pointed out that the principal factor which influences production of olefines and chloro-olefines during vapor phase chlorination of a saturated aliphatic hydrocarbon containing more than two and less than six carbon atoms is the temperature at which effective surfaces in contact with the reaction mixture are maintained. The following are other factors which we have found to influence the production of such olefinic by-products, viz:—

1. Composition of surfaces in contact with the reaction mixture.
2. Speed at which gaseous reactants are passed through the reaction zone.
3. Temperature of the reaction mixture itself.

When chlorinating an aliphatic hydrocarbon under the influence of light, we have found that a decrease in the mole ratio of hydrocarbon reactant to chlorine does not appreciably change the quantity of olefine production, although such decrease in ratio may increase to some extent the production of polychlorinated products.

With regard to the composition of surfaces in contact with a reaction mixture, we have found that the composition of such surfaces materially influences the production of olefines and particularly of chloro-olefines during chlorination of an aliphatic hydrocarbon and that the upper temperature at which such surfaces can be maintained without formation of olefines and particularly chloro-olefines occurring is dependent somewhat on the composition of the surfaces. However, regardless of the composition of surfaces in contact with the reaction mixture during vapor phase chlorination of an aliphatic hydrocarbon, the yields of olefine and chloro-olefine by-products are always considerably lower when the effective surfaces in contact with a reaction mixture are maintained at a temperature below 200° C., than when the same reaction is carried out under similar operating conditions except that such contact surfaces are permitted to rise to a temperature appreciably higher than 200° C.

During chlorination of hydrocarbons in the presence of metal surfaces, e. g., iron, nichrome, etc., we have observed that such surfaces tend to darken. The surface in contact with the reaction mixture thereafter probably is not the pure metal, but rather a very thin layer of compounds of said metal. The exact composition of such darkened surface is not known. Hereinafter, where any particular metal surface is referred to it shall be understood that said surface may be composed either of the free metal or of compounds thereof formed through chlorinating an aliphatic hydrocarbon in the presence of free metal surface.

In order that the influence which the composition of surfaces in contact with a chlorination mixture exerts upon the production of chloro-olefines may be fully understood, reference is again made to Fig. 1 of the annexed drawings. Fig. 1 is a graph showing percentage yields of chloro-isobutylenes (based on the respective quantities of chlorine reacted) obtained by reacting a mixture of chlorine with 1.94 times its molecular equivalent of isobutane at various temperatures and in intimate contact with various surfaces, having the compositions indicated in said graph, while maintaining both the reacting mixture and such surfaces at substantially the same temperature. The experiments upon which the data graphically presented in Fig. 1 was based were each carried out in the following manner. Measured quantities of chlorine and isobutane were mixed in the dark at room temperature and the mixture was conducted in steady flow through a glass walled reaction chamber illuminated by light. Within said reaction chamber, the material being tested as a contact catalyst was, in all instances except during testing of glass, located in such position as to be immersed within the gaseous mixture during reaction and the reaction temperature was measured as nearly as possible to a point at which the catalyst made contact with the reacting mixture. In the cases of the metals tested, the metal catalysts were employed in the form of gauzes and the reacting mixture was passed through the mesh of the same. When carbon was tested, a carbon strip was suspended in the center of the reaction zone. In testing glass, the glass walls of the reaction chamber served as the contact catalyst. In obtaining data for each curve of Fig. 1, the same catalyst sample was employed in determining all points of the curve. Also, the rate of gas flow was maintained substantially constant during determination of all points of each curve. The chloro-isobutylene production during the course of such tests was determined by collecting a sample of chlorinated products (all having boiling points considerably higher than room temperature) formed at a given reaction temperature and titrating the sample with bromine for unsaturated compounds. Isobutylene, which boils at —6° C. under atmospheric pressure, was not present in the samples analyzed.

While the curves in Fig. 1 show only the influence of catalytic surfaces on the production of chloro-isobutylene and set forth the highest temperatures at which chlorination may be carried out in the presence of certain contact surfaces without a measurable quantity of chloro-isobutylene being formed, we have found the composition of surfaces in contact with a chlorination mixture to influence olefine, e. g., butylene, formation in much the same manner as it influences chloro-isobutylene formation. The data presented graphically in Fig. 1 is, accordingly, roughly applicable to olefine formation as well as to chloro-isobutylene formation. Furthermore, during the chlorination of any saturated aliphatic hydrocarbon containing more than two and less than six carbon atoms (e. g., propane, normal butane, normal pentane, isopentane, etc.) the composition of surfaces in contact with the reaction mixture influence the production of the corresponding olefines and chloro-olefines in a manner similar to that illustrated in Fig. 1. Again, while each curve in Fig. 1 is based on data collected while employing a reaction mixture consisting of chlorine and 1.94 times its molecular equivalent of isobutane, the curves are not altered appreciably when other ratios of chlorine with excess hydrocarbon are employed. It has has previously been pointed out that a mere change in the ratio of chlorine to excess hydrocarbon does not greatly influence the quantities of olefines and chloro-olefines that are formed during chlorination.

From Fig. 1 of the annexed drawings, then, it is apparent that during vapor phase chlorination of a saturated aliphatic hydrocarbon containing more than two and less than six carbon atoms, it is preferable that iron surfaces in contact with the reaction mixture be maintained at a temperature lower than 165° C.; that nichrome surfaces be maintained at a temperature below 170°

C.; that silver surfaces be maintained below 175° C.; that carbon surfaces be maintained at a temperature below 190° C., and that glass surfaces be maintained at a temperature below 235° C.

We have found that the time required to completely react the chlorine present in a chlorination mixture and the time during which such chlorination mixture is exposed to reaction conditions influences to some extent the quantities of olefines and chloro-olefines that are formed. Thus, during operation, we prefer to introduce a gaseous reaction mixture into a reactor at such rate that a given portion of the mixture passes through the reaction zone in less than 10 seconds and to cool the mixture as quickly as possible after reaction. It is important, however, that the time of reaction, the intensity of light to which the reacting mixture is exposed, and other reaction conditions be such that substantially all of the chlorine employed is reacted. If chlorine passes through the reaction zone without reacting, its presence in the hydrocarbon mixture may cause serious difficulty and even explosion during the subsequent steps of handling the mixture.

Although propane, a butane, or a pentane may be chlorinated at temperatures higher than 200° C. without formation of appreciable quantities of olefines and chloro-olefines provided surfaces in contact with the reaction mixture are maintained at a temperature lower than that at which such surfaces catalyze formation of such olefinic by-products, such surfaces may be maintained at a temperature below that at which they display catalytic activity, and the reaction mixture itself be heated to a temperature at which there occurs cracking and resultant olefine formation. In general we find it advisable to maintain the reaction mixture itself at a temperature below 250° C. in practicing our invention, and we prefer to maintain both the reaction mixture and surfaces in contact with the same at a temperature below that at which said surfaces catalyze formation of olefines and chloro-olefines. Thus, in chlorinating a hydrocarbon within an iron reactor, we prefer to carry the reaction out under the influence of light at a temperature lower than 165° C. using the heat of reaction to maintain the reaction temperature. Since, under such conditions, external heat is not applied to the reactor, iron surfaces in contact with the reaction mixture obviously are at a tmperature below 165° C., i. e. below the temperature at which iron catalyzes olefine and chloro-olefine formation.

In practicing the present invention it is advantageous to react the chlorination mixture as quickly as possible and at a temperature below that at which surfaces in contact with the mixture do not catalyze olefine and chloro-olefine formation. In order to obtain a rapid rate of reaction such that chlorine is completely reacted during passage through the reaction zone and still maintain a relatively low reaction temperature several conditions are necessary, viz.:—

1. The reaction must be strongly catalyzed, light rich in blue light waves being preferred as a catalyst. Light from an ordinary Mazda electric light bulb gives satisfactory results.

2. The chlorine employed should be quite pure. When chlorine containing more than 5 per cent, by volume, of air is employed, it is very difficult to catalyze the reaction sufficiently to react the chlorine completely.

3. Between 1 and 10 moles of hydrocarbon reactant per mole of chlorine should be present in the reaction mixture. The reaction may be carried out successfully using a mixture of the hydrocarbon reactant and chlorine in molecular ratio greater than 10/1 if actinic light of sufficient intensity is employed. However, the reaction tends to become sluggish when the molecular ratio of hydrocarbon to chlorine exceeds 10/1 and the cost of operating the entire process increases as the ratio of hydrocarbon reactant to chlorine is increased.

The intensity of light required for successful operation according to the present method cannot be stated exactly, such intensity being dependent upon a number of variable conditions among which may be mentioned:—

1. Volume of gaseous reaction mixture to be catalyzed by light from a given source.
2. Rate of gas flow.
3. Quality or predominating wave length of light employed as a catalyst.
4. Reaction temperature.
5. Influence of other catalysts, if present.

While the intensity of light required to effect complete reaction of chlorine varies with change in other operating conditions, the correct light intensity may readily be determined in any given instance merely by increasing the light intensity during reaction until no free chlorine passes from the reactor.

The following example sets forth one of the various ways in which the principle of our invention may be employed. Said example is purely illustrative and is not to be construed as a limitation on the invention.

*Example*

Chlorine was mixed in the dark and at room temperature with twice its molecular equivalent of 95 per cent pure isobutane (containing about 5 per cent of other hydrocarbons such as normal butane, pentanes, hexanes, etc.). The gaseous mixture was passed at a substantially constant rate of 66.6 liters per hour into a double tube reactor constructed in such manner that the reaction mixture flowed between the outer wall of a glass tube containing seven 50 watt electric lamps and the inner wall of the reactor shell which was constructed of a chromium-nickel steel commonly called KA2 steel. Reaction occurred immediately and heat liberated during reaction raised the gaseous mixture to the temperature 184° C. This reaction temperature was maintained by cooling the outside of the reactor with water. The reacted mixture which passed from the chlorinating chamber was cooled to approximately 40° C., whereby a portion of the chlorinated products were condensed. The residual gaseous mixture was scrubbed with water to remove hydrogen chloride therefrom, during which operation a relatively small quantity of chlorinated hydrocarbons were condensed and formed a separate layer. The remaining gaseous mixture was cooled sufficiently to completely condense the same. The condensate was carefully distilled to obtain one fraction which was gaseous under atmospheric conditions and which consisted of unreacted isobutane containing air and isobutylene as impurities, and another fraction which was liquid under atmospheric conditions and which consisted of chlorinated hydrocarbons. Each of chlorinated hydrocarbon fractions collected and the residual gas fraction were analyzed separately and from the analysis it was determined that the composite body of chlorinated products from the reaction was composed of the following compounds present in the percentages of the total weight of all chlorinated products as slated:—(1) isobutyl chloride, 60 per cent; (2) tertiary butyl chloride, 20 per cent; (3) polychlorinated hydrocarbons consisting principally of dichlorobutanes, 19.4 per cent; and (4) chlorobutylenes, 0.6 per cent. Isobutylenes was formed in very small quantity, if at all, during the chlorination. All of the chlorine employed was reacted.

Our invention may be practiced in ways other than that described in the above example. For instance, instead of employing isobutane as a reactant we may chlorinate any saturated aliphatic hydrocarbon containing more than two and less than six carbon atoms (e. g. propane, normal butane, normal pentane, etc. or mixtures thereof) under the conditions described without forming appreciable quantities of olefines or chloro-olefines. Also, the hydrocarbon reactant may contain impurities, e. g. appreciable quantities of saturated aliphatic hydrocarbons outside the class mentioned above.

Furthermore, the hydrocarbon reactant and chlorine, respectively, may be employed in any molecular ratio greater than 10 in practicing our invention. We prefer, however, to employ between 1 and 10 moles of hydrocarbon reactant for each mole of chlorine used. A change in the ratio of hydrocarbon reactant to chlorine does not materially alter the quantity of olefine or chloro-olefine production if all other operating conditions remain constant.

Again, the chlorination may be carried out at any temperature below 250° C. provided that surfaces in contact with the reaction mixture are maintained at a temperature below 200° C. In practice, we prefer to maintain both the reaction mixture and surfaces in contact with the same at a temperature below that at which the surfaces promote formation of olefines and chloro-olefines said temperature being dependent to some extent upon the composition of the contacting surfaces, but being readily determinable in any given instance.

A saturated aliphatic hydrocarbon, containing more than two and less than six carbon atoms, may be chlorinated in vapor phase, according to the present method, at any temperature below that at which cracking occurs, provided that surfaces in contact with the reaction mixture are maintained at a temperature below 200° C. and provided the chlorination is carried out under the influence of light of sufficient intensity to cause substantially complete reaction. By chlorinating isobutane under the influence of a powerful ultra-violet light, for instance, the reaction may be carried out at a temperature as low as 70° C. without difficulty.

In chlorinating a hydrocarbon according to our method the reaction may be carried out under subatmospheric, atmospheric, or superatmospheric pressure provided the reactants are maintained in vapor phase. In practice, we frequently find it advantageous to carry out both the chlorination step and the steps of separating the reaction products under a pressure of from 15 to 100 pounds per square inch, gauge.

The present invention, in brief, comprises reacting a mixture of chlorine with between one and ten times its molecular equivalent of a vaporized saturated aliphatic hydrocarbon containing more than two and less than six carbon atoms under the influence of light and under temperature conditions such as to inhibit formation of olefines and/or chloro-olefines during chlorination.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:—

1. In a continuous flow method for the chlorination of saturated aliphatic hydrocarbons, the step of reacting a gaseous mixture consisting of chlorine and more than its molecular equivalent of saturated aliphatic hydrocarbons containing from three to five carbon atoms, under the influence of light while maintaining the reaction mixture at a temperature below 250° C. and maintaining surfaces in contact with said mixture at a temperature below 200° C.

2. In a continuous flow method for the chlorination of a saturated aliphatic hydrocarbon, the step which consists in reacting a gaseous mixture of chlorine and between 1 and 10 times its molecular equivalent of a saturated aliphatic hydrocarbon containing from three to five carbon atoms under the influence of light while maintaining both the reaction mixture and surfaces in contact therewith at a temperature below 200° C.

3. In a continuous flow method for the chlorination of a saturated aliphatic hydrocarbon, the steps which consist in mixing chlorine, in the dark, with between 1 and 10 times its molecular equivalent of a gaseous saturated aliphatic hydrocarbon containing from three to five carbon atoms, passing the gaseous mixture through a reaction zone within which the chlorine is completely reacted with the aliphatic hydrocarbon under the influence of actinic light in less than 10 seconds after the chlorine enters the reaction zone, maintaining both the reaction mixture and surfaces in contact therewith at a temperature below 200° C., and cooling the reacted mixture to a temperature below 100° C.

4. In a continuous flow method for the chlorination of a butane, the step of reacting a gaseous mixture consisting of chlorine and more than its molecular equivalent of a butane under the influence of light while maintaining both the reaction mixture and surfaces in contact therewith at a temperature below 200° C.

5. In a continuous flow method for the chlorination of a butane, the step which consists in reacting a gaseous mixture of chlorine with between 1 and 10 times its molecular equivalent of a butane under the influence of light while maintaining both the reaction mixture and surfaces in contact therewith at a temperature below 200° C.

6. In a continuous flow method for the chlorination of isobutane, the step of reacting a gaseous mixture consisting of chlorine and more than its molecular equivalent of isobutane under the influence of light while maintaining both the reaction mixture and surfaces in contact therewith at a temperature below 200° C.

7. In a continuous flow method for the chlorination of isobutane, the step which consists in reacting a gaseous mixture of chlorine with between 1 and 10 times its molecular equivalent of isobutane under the influence of light while maintaining both the reaction mixture and surfaces in contact therewith at a temperature below 200° C.

8. In a continuous flow method for the chlorination of isobutane, the steps which consist in mixing chlorine with between 1 and 10 times its molecular equivalent of isobutane in the substantial absence of light, passing the gaseous mixture through a reaction zone within which chlorine is reacted with isobutane under the influence of actinic light of such intensity that substantially all chlorine is reacted within 10 seconds after entering the lighted zone, and maintaining both the reaction mixture and surfaces in contact therewith at a temperature below 200° C.

9. In a continuous flow method for the chlorination of isobutane, the steps which consist in mixing chlorine with between 1 and 10 times its molecular equivalent of isobutane in the substantial absence of light and at a temperature below 120° C., passing the gaseous mixture through a reaction zone wherein chlorine is reacted with isobutane under the influence of actinic light of such intensity that substantially all chlorine is reacted within 10 seconds after entering the lighted zone, maintaining both the reaction mixture and surfaces in contact therewith at a temperature below 200° C., cooling the reacted mixture to a temperature below 100° C., separating both hydrogen chlorine and chlorinated butanes from unreacted isobutane and recycling the latter through the steps described above.

10. The method of inhibiting olefine and chloro-olefine formation during vapor phase chlorination of a saturated aliphatic hydrocarbon, containing from three to five carbon atoms, by a continuous flow process wherein actinic light is employed as a chlorination catalyst, which comprises maintaining both the reaction mixture and surfaces in contact therewith at a temperature below 200° C.

11. The method of inhibiting isobutylene and chloro-isobutylene formation during vapor phase chlorination of isobutane under the influence of actinic light by a continuous flow process, which comprises maintaining both the reaction mixture and surfaces in contact therewith at a temperature below 200° C.

12. In a continuous flow method for the vapor phase chlorination of a saturated aliphatic hydrocarbon, containing from three to five carbon atoms, under the influence of actinic light, the step of cooling surfaces in contact with the reacting mixture to such temperature that the formation of chloro-olefines is substantially prevented.

13. In a continuous flow method for the vapor phase chlorination of an aliphatic hydrocarbon, containing from three to five carbon atoms, under the influence of actinic light, the step of cooling surfaces in contact with the reacting mixture to such temperature that the formation of olefines and chloro-olefines is substantially prevented.

14. In a continuous flow method for the vapor phase chlorination of isobutane under the influence of actinic light, the step of cooling surfaces in contact with the reacting mixture to such temperature that the formation of isobutylene and chloro-isobutylene is substantially prevented.

EDGAR C. BRITTON.
GERALD H. COLEMAN.
BARTHOLDT C. HADLER.